United States Patent [19]

Hulse

[11] 4,441,539

[45] Apr. 10, 1984

[54] TIRE PRESSURIZATION CONTROL SYSTEM

[75] Inventor: David O. Hulse, Exton, Pa.

[73] Assignee: The Budd Company, Troy, Mich.

[21] Appl. No.: 402,888

[22] Filed: Jul. 29, 1982

[51] Int. Cl.³ .................. B60C 23/10; B60C 29/00
[52] U.S. Cl. .................... 152/417; 91/318; 137/624.14; 152/427; 303/9
[58] Field of Search ............ 152/417, 416, 427, 415; 137/624.14; 91/318; 303/9; 285/134

[56] References Cited

U.S. PATENT DOCUMENTS

| 2,634,782 | 4/1953 | Turek et al. | 152/417 |
| 2,849,047 | 8/1958 | Lamont et al. | 152/417 |
| 3,276,503 | 10/1966 | Kilmarx | 152/417 |
| 4,290,509 | 9/1981 | Hulse | 188/181 A |
| 4,387,931 | 6/1983 | Bland | 303/9 X |

Primary Examiner—William A. Powell
Assistant Examiner—Thomas Bokan
Attorney, Agent, or Firm—Edward M. Farrell; Herman Foster; Thomas I. Davenport

[57] ABSTRACT

A tire pressure control system includes means for restoring and maintaining specified tire pressure by applying intermittent regulated air pressure to the tire through a rotating seal near the wheel when the air pressure is too low. If the air pressure in the tire is at a predetermined safe operating level, the air pressure through the rotating seal is blocked.

5 Claims, 5 Drawing Figures

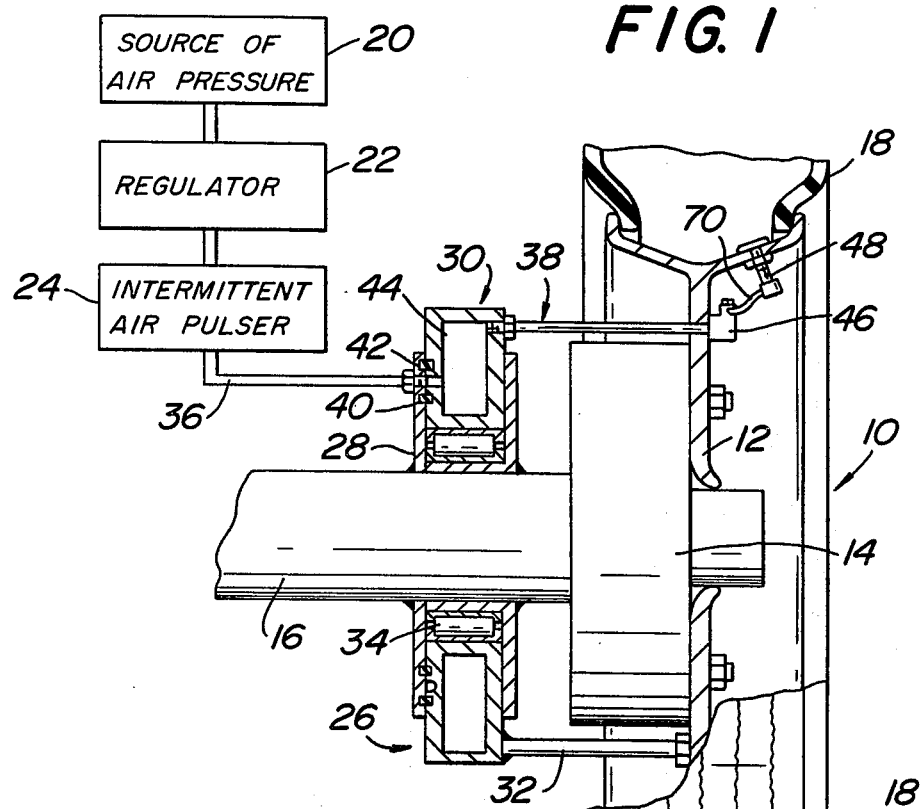
FIG. 1
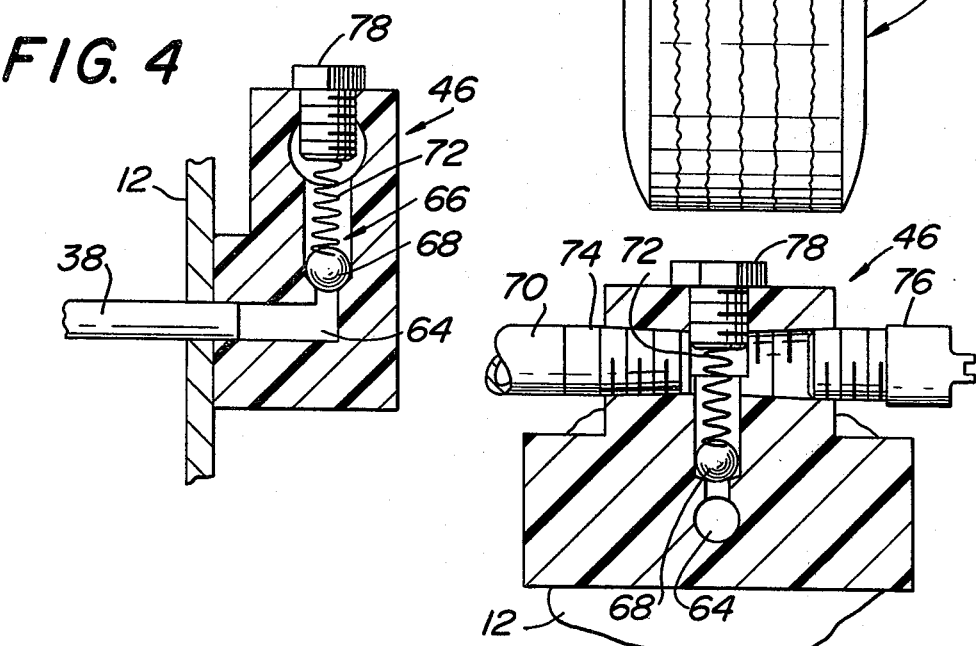
FIG. 4
FIG. 4a

TIRE PRESSURIZATION CONTROL SYSTEM

BACKGROUND OF THE INVENTION

A problem encountered in many pneumatic tire systems involves maintaining the air pressure in the tires. Furthermore, when multiple sets of dual tires are used, low pressure in one of the tires may often go undetected for long periods of time because the other wheels and tires in the vehicle are sufficient to support the loads and frequently hinder access to inner wheels of the set.

While many drivers periodically check the tires of a vehicle during stop overs by tapping the tires with a tool, this precaution is sometimes overlooked. In any case, it is not effective for detecting low pressure in a tire during operation between checks. A driver often has no warning when the pressure in one of a number of tires drops below a safe operating level while he is driving the vehicle. Low pressures during operation may result from slow leaks in the tire, for example.

During operation, low pressure in one of the tires may cause any one of a number of serious problems. When pressure in one tire is too low, it may cause another tire to heat up and possibly cause a fire. Continued operation of the poorly inflated tire may also cause overheating, shredding, and destruction of the tire which, if the low pressure were detected and restored in time, could be recappable.

It is desirable that a tire pressure and maintenance system in a vehicle utilize a source of pressure already available. If for some reason the system is inoperable, it is also desirable to have independent means for inflating the tires and for detecting the pressure therein. Also, it is desirable to brake the vehicle to prevent movement thereof when a large leak in one of the tires develops.

In a patent entitled "Tire Pressure Control in a Vehicle", U.S. Pat. No. 4,387,931, issued June 14, 1983, and assigned to the same assignee as the present invention, there is described a tire pressure control system in which many of the problems discussed above have been solved to a great extent in a trailer system. In this application, tire pressure was applied to the tires through a hollow tubular structure which was located at the axis of the wheel and originated from a source of pressure located inboard of the wheels of the trailer. The arrangement illustrated, while applicable to trailers having hollow axle units, pose some problems when solid axles are used, as in a tractor, bus, or similar type vehicle.

A patent, U.S. Pat. No. 4,290,509 entitled "Anti-Lock System" describes a system for connecting air pressure through a wheel by means of a pressure path from outboard to inboard of the wheel and which is offset from the wheel axis as is necessary to solid axle vehicles, such as tractors. In this system, a pair of concentric sealing rings form a sealed chamber to connect a source of stationary air pressure located inboard of the wheel to an anti-lock switching device rotatable with the wheel outboard of the wheel. While this arrangement solves a problem of how to connect air pressure from a source through a wheel rotating on a solid axle, the sealing arrangement involving the rotating seal rings poses a problem.

In the system described in U.S. Pat. No. 4,387,931, the system incorporates "full time" pressurization of the tires. Rotating seals of the type described in the aforementioned anti-skid patent would present problems if they were used in tractors and full time pressurization of the tires was employed. The reason for this is that the temperature of the seal rings would rise greatly. Also the constant pressure of the seals would greatly reduce the life of the seals because of the constant high friction resistance involved.

OBJECTS OF THE INVENTION

It is an object of this invention to provide an improved tire inflation system for maintaining a plurality of tires on vehicles.

It is a further object of this invention to provide an improved tire inflation system having all of the advantages of the aforementioned patent application in addition to other advantages.

It is a further object of this invention to provide an improved tire inflation system for maintaining uniform the air pressure in a plurality of tires on a vehicle in which the connecting means from the pressure source through the wheels is not subject to excessive temperature and wear.

BRIEF SUMMARY OF THE INVENTION

In accordance with the present invention, a tire pressurization system includes means for intermittently applying regulated pressure from a source of pressure through a rotating seal to a rotatably mounted tire on a vehicle. When the pressure in the tire is at a predetermined level, the air pressure from the regulated source of pressure is blocked. When the pressure in the tire drops below a predetermined safe operating level, regulated air pressure is applied to the tire through the rotating seal.

Other objects and advantages of the present invention will be apparent and suggest themselves to those skilled in the art from a reading of the following specification and claims taken in conjunction with the accompanying drawings.

BRIEF DESCRIPTION OF THE DRAWINGS

FIG. 1 is a view, partly in cross-section and partly in block diagram form, illustrating one embodiment of the present invention;

FIG. 4 is a cross-sectional view of a type of pressure control valve adapter unit as illustrated in FIG. 1 which may be used in the present invention; and FIG. 4a is a cross-sectional view of the pressure control valve of FIG. 4 rotated 90 degrees.

DETAILED DESCRIPTION OF THE PREFERRED EMBODIMENTS

In describing the present invention, some of the features relating to the aforementioned issued patents have been combined. For example, the adapter unit or valve pressure control device may be of the type illustrated in the aforementioned U.S. Pat. No. 4,387,931. The rotating seal involving a pair of concentric rings or concentric parallel sealing surfaces to provide an air chamber therebetween may be of the type described in the aforementioned U.S. Pat. No. 4,290,509. In the description to follow, only a single wheel unit will be illustrated. It will be assumed that the invention is applicable to a plurality of wheels in a vehicle or combination of vehicles such as a tractor-trailer. However, as mentioned above, the concentric seal was developed primarily in the case for vehicles which have solid axles and wherein the source of air pressure cannot be connected through the axis of rotation of the wheel.

Figure 2:
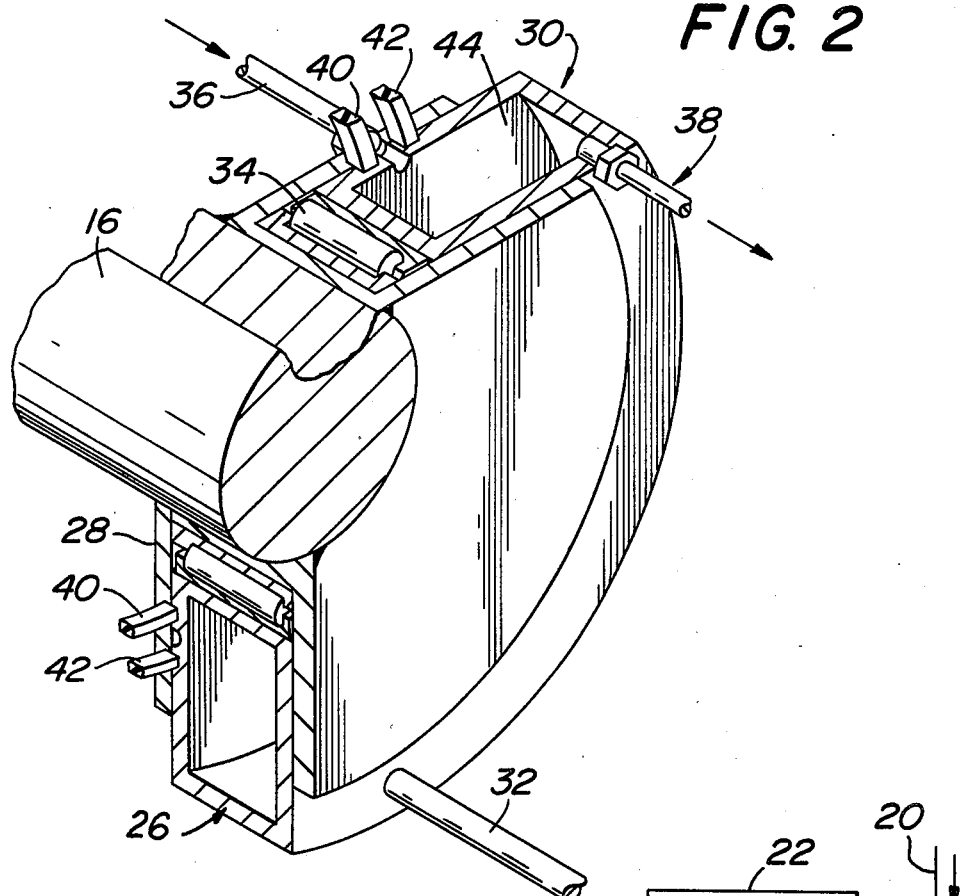
FIG. 2 is an enlarged view of a portion of FIG. 1 illustrating the means for connecting a source of regulated air pressure from a stationary source through a rotatable wheel on a vehicle, in accordance with the present invention.

Referring to FIGS. 1 and 2, a wheel unit 10 includes a main rim 12 to be connected to a hub 14 which is adapted to be rotatably moved with respect to an axle 16. The rim portion 12 includes a tire 18 suitably mounted thereto. A source of air pressure 20, which may be a tank in a tractor-trailer system, for example, is connected to a regulator 22 which limits or controls the amount of air to be supplied to the tire 18. Air from the regulator 22 passes through an intermittent air pulser device 24 to a rotating seal arrangement 26. The purpose of the intermittent air pulser device 24 will be described subsequently in detail.

The rotating tunnel 26 comprises a structural member 28 extending around the axle 16 and fixedly mounted thereto. The member 28 is adapted to receive a hollow circular member 30 which has a concentric air chamber 44 therein. The member 30 is fixedly connected to the rim 12 by any suitable means, such as a rod or pin 32. Consequently, the member 30 rotates along with the wheel unit 10 and rotates with respect to the member 28 which is fixed to the axle 16. The member 30 is disposed to be supported by and ride on bearings 34 during operation.

The regulated air from the intermittent air pulser 24 is applied to a conduit 36 through the rotating air arrangement 26 and to an output conduit 38. During operation, as the member 30 is rotating, a seal is provided between the fixed member 28 and the hollow member 30. The seal includes a set of concentric flexible sealing members 40 and 42. Ring members 40 and 42 may be affixed to grooves in the member 30 and maintained with a set of grooves in the member 28 in a sealing relationship. As the ring members 40 and 42 are being rotated, an air chamber or tunnel is provided therebetween so that the regulated air from the conduit 36 passes through the air chamber, is directed between the rings 40 and 42, and then into the chamber 44 of the member 30 where it is passed, then to the outlet conduit 38.

The air pressure in the conduit 38 is passed through an adapter valve 46 which controls the air pressure applied to a valve or stem 48 connected to pass air into the tire 18.

The present system is designed to pass air into the tire 18 when the air pressure therein drops below some predetermined safe level, as determined by the operation of the adapter unit 46. When the air pressure in the tire 18 is at some predetermined safe level, no additional air will be applied to the tire.

In the present invention, the air pressure from the regulator 22 will only reach the tire when the air pressure in the tire 18 is below a predetermined set level. The loss of tire pressure usually occurs at a relatively low rate, for example 5 p.s.i. loss in 3 hours. Therefore, over a short time period, such as 2 minutes, the loss of air pressure in the tire is very small and insignificant. Consequently, it is not necessary to maintain air pressure to the chamber between the concentric rings 40 and 42 at all times. This minimizes the amount of pressure on the rings 40 and 42 thereby reducing friction and wear in the rings. However, over a short period of time, the loss of air pressure may be small but sometimes significant. Then it is necessary to replenish the lost air to an adequate level.

Figure 3:
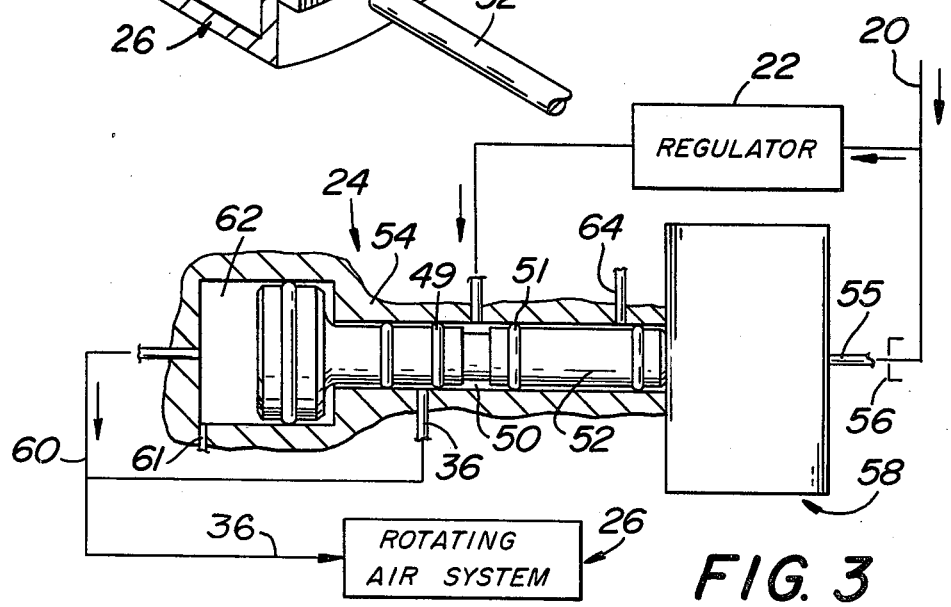
FIG. 3 is a view, partly in cross-section and partly in block diagram form, illustrating means for producing intermittent regulated pressure of a type shown in one of the blocks in FIG. 1.

Referring particularly to FIG. 3, one type of intermittent air pulser device is illustrated. Air from the source 20, which is generally included in the vehicle supply system is divided with a portion of it proceeding to the regulator 22 from which it enters to the intermittent pulser 24. The pressure regulator 22 is generally set at some predetermined lower pressure which is adequate to meet the tire pressure requirements, such as, for example, 100 p.s.i. From the regulator 22 the air proceeds into a passageway or chamber 50 formed with a piston-like member 52 within the main housing 54 of the air pulser device 24. The 100 p.s.i. air pressure is normally retained in the chamber 50.

Another part of the air from the source 20 proceeds to a conduit 55 through a small orifice device 56. This orifice device or valve restricts the air flow to the conduit 55 to a relatively slow rate. The restricted air enters a relatively large chamber 58. Because the flow of air entering into the chamber 58 is constant, but restricted by the device 56, the pressure built up in the large chamber 58 takes a period of time to reach the pressure required to operate the piston 52 within the device 24. When that relatively high pressure is achieved in the chamber 58, the piston 52 moves to the left, opens conduit 64 and moves the chamber 50, and seal rings 49 and 51, to permit the 100 p.s.i. air to exit via conduit 36 to the rotating air system 26 (FIGS. 1 and 2). In addition, the air supplied from the conduit 36 enters a small chamber 62 via conduit 60. When there is no significant flow in conduit 36 to the rotating air tunnel arrangement 26 as a result of no loss of tire pressure, the pressure in conduit 60 to the chamber 62 is high enough to cause the piston 52 to shuttle to the right to the position illustrated in FIG. 3 because pressure in the large chamber 58 has since been reduced by venting at conduit 64 faster than pressure in chamber 58 can be maintained by air from source 20 passing through orifice 56. At this position shown in FIG. 3, chamber 50 is closed and conduits 36, and 60 have vented empty via another small conduit 61. Thus sealing rings 40 and 42 are no longer pressurized thereby reducing friction, heat and wear. Conduit 64 is closed, as shown in FIG. 3, but air from source 20 is continuously entering chamber 58 and will then build up sufficient pressure in the large chamber 58 to cause the piston 52 to shuttle open and thus repeat the cycle. Note: Conduit 64 must be larger than the orifice 56.

In the event there is significant flow in conduit 36 to the rotating air system 26 as a result of loss of tire pressure, the pressure in conduit 60 to the chamber 62 is reduced accordingly. Thus when piston 52 is shuttled to the left, the pressure in conduit 60 and 62 is inadequate to cause piston 52 to return to original position of FIG. 3. Air from regulator 22 continues to pass through chamber 50, through conduit 36, and to the rotating air system 26. When the tire has filled (to the 100 p.s.i. preset pressure, for example), flow in conduits 36 and 60 stops, pressure increases therein to a value sufficient in chamber 62 to cause piston 52 to shuttle closed as shown in FIG. 3.

When the air pressure exists in the rotating air system 26, at conduit 38 (FIGS. 1 and 2) it proceeds across the rotating wheel and is applied to the tire 18, as illustrated in FIG. 1, through an adapter valve 46.

Referring to FIGS. 4 and 4a, a type of valve illustrated in the aforementioned patent application is illustrated.

This adapter pressure control unit 46 illustrated, however, is designed for a single tire illustrated and not for a double tire arrangement as described in the aforementioned patent application. It is apparent, however, that the valve adapter unit could be multiplied to operate in substantially the same manner for two tires on a single set of wheels. The air pressure from the conduit 38 is applied through the rim 12 into a chamber 64 of the adaptor unit 46. Air in the chamber 64 is adapted to pass into a chamber 66 which includes an enlarged circular section. A component 68 is adapted to be connected to the standard tire fill stem 48 through a conduit 70 (Fig. 1). When chamber 64 has the 100 p.s.i. air pressure greater than the tire pressure in chamber 66, via conduit 70, the component 68 associated with a spring 72 is pushed away from its seat within the chamber 66 against the tension of the spring so as to permit air to go around the particular component 68 from the chamber 64 into the chamber 66 and eventually into the tire 18 via conduit 70 and valve 48. The 100 p.s.i. air is regulated by the regulator 22 and the 100 p.s.i. tire pressure is normally the same on both sides of the component 68. If the regulator 100 p.s.i. pressure is higher than the pressure within the particular tire 18, a lower pressure in the tire involved is indicated. The pressure from the regulator 22 which is applied to the chamber 64 pushes the component 68 against spring 72 to cause the air to pass from the regulator 22 into the tire 18.

As illustrated in FIG. 4a, the adapter unit 46 attaches to the conduit 70 at fitting 74. Another component 76 provides a standard tire service valve and stem for the tire 17. The reason for this is to permit a driver to apply external air pressure to the tire if desired or in the event vehicle air supply 20 is inoperable.

In addition, an operator may use a tire gauge to actually check the pressures within the system. The spring 72 is held in position by means of a closure 78. Closure 78 is engaged to be connected to the adapter unit.

It is seen that the present invention has provided a system which intermittently supplies air to tires through a chamber between rotatable seals only when the air tire pressure is too low. When the tire pressure within the tire is normal, no replacement air will be applied from the regulator through the chamber between the rotating seal. This greatly enhances the wear properties of the seal rings because no pressure is being applied to the seals during the majority of time the wheel is turning. The relatively infrequent cycling of 100 p.s.i. air pressure to the seals minimizes the friction involved thereby reducing the tendency of the seals to heat up and thereby deteriorate the seals. Also, the life of the seal is greatly increased by the cycling of the pressures on the seals, during normal operation, by the operation of the pulser.

In the event this system must furnish large quantities of air to maintain tire pressure, such as a blow out or large hole in the tire, which is beyond the vehicle air system 20 ability to supply, the vehicle air system pressure may be designed to drop to a point wherein mechanically engaged emergency brake system will function, thus slowing the vehicle. This loss of vehicle air system pressure is found in many commercial vehicle applications, such as tractor-trailer systems.

What is claimed is:

1. In a vehicle including a tire mounted to a rotatable wheel about an axle,
    a tire pressurization system for maintaining uniform and constant pressure in said tire comprising:
    (a) a source of regulated air pressure;
    (b) a valve means connected to said wheel for receiving air pressure and applying it to said tire;
    (c) means for connecting said regulated air pressure from said source to said valve means, said means for connecting including a member fixedly mounted with respect to said axle, a rotatable member secured to said member connected to rotate with said wheel, and sealing means providing an air chamber to connect air pressure from said fixedly mounted member to said rotatable member; and
    (d) air pulsing means connected from said source of regulated air pressure to said means for connecting to apply intermittent air pressure to said means for connecting,
    (e) said intermittent air pressure through said air pulsing means being controlled by the amount of added pressure required to bring said tire up to said predetermined pressure level;
    (f) said air pulsing means comprising a piston disposed in a housing responsive to pressure from chambers on either side thereof to intermittently connect and disconnect the air pressure from said regulator to said means for connecting;
    (g) tire pressure control means connected to said tire responsive to the air pressure in said tire, and
    (h) means for applying the intermittent air pressure from said air pulsing means through said means for connecting to respond to the difference in air pressure in said tire and said intermittent air pressure to control the added pressure applied to said tire;
    whereby air pressure is applied to said tire only when the pressure in the tire is below a predetermined pressure level.

2. A tire pressurization system as set forth in claim 1 wherein the intermittent air pulses from said air pulsing means is controlled by a main source of air applied to one of said chambers through an orifice device which limits the rate of air flow into said one chamber to move said piston.

3. A tire pressurization system as set forth in claim 2 wherein said sealing means comprise a set of concentric seal rings operating in planes parallel to the axis of said wheel.

4. A tire pressurization system as set forth in claim 3 wherein the intermittent air pressure through said air pulsing means is applied to the air chamber between said concentric seal rings only at intermittent time intervals thereby reducing the overall pressure on said concentric seal rings.

5. A tire pressurization system as set forth in claim 4 wherein said tire pressure control means includes means to permit independent checking of the air pressure in said tire and adding air pressure to said tire independent of said regulator.

* * * * *